US009720744B2

(12) United States Patent
Knauth et al.

(10) Patent No.: US 9,720,744 B2
(45) Date of Patent: Aug. 1, 2017

(54) PERFORMANCE MONITORING OF SHARED PROCESSING RESOURCES

(75) Inventors: Laura A. Knauth, Portland, OR (US); Peggy J. Irelan, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 239 days.

(21) Appl. No.: 13/995,566

(22) PCT Filed: Dec. 28, 2011

(86) PCT No.: PCT/US2011/067629
§ 371 (c)(1),
(2), (4) Date: Jun. 19, 2013

(87) PCT Pub. No.: WO2013/100981
PCT Pub. Date: Jul. 4, 2013

(65) Prior Publication Data
US 2013/0332933 A1    Dec. 12, 2013

(51) Int. Cl.
G06F 9/46      (2006.01)
G06F 9/54      (2006.01)
G06F 11/34     (2006.01)

(52) U.S. Cl.
CPC .............. G06F 9/54 (2013.01); G06F 11/348 (2013.01); *G06F 2201/88* (2013.01)

(58) Field of Classification Search
None
See application file for complete search history.

(56) References Cited

U.S. PATENT DOCUMENTS

| | | | |
|---|---|---|---|
| 4,837,688 A * | 6/1989 | Cronauer et al. | 718/103 |
| 6,134,579 A | 10/2000 | Tavallaei et al. | |
| 6,651,243 B1 | 11/2003 | Berry et al. | |
| 6,823,497 B2 * | 11/2004 | Schubert | G06F 17/5022 716/106 |
| 7,805,593 B1 | 9/2010 | Donlin | |
| 8,230,059 B1 * | 7/2012 | Santos et al. | 709/224 |
| 8,887,168 B2 * | 11/2014 | Yu | 718/104 |
| 2002/0133593 A1 * | 9/2002 | Johnson et al. | 709/226 |
| 2002/0161848 A1 * | 10/2002 | Willman et al. | 709/213 |
| 2003/0131325 A1 * | 7/2003 | Schubert | G06F 17/5022 716/106 |
| 2005/0154811 A1 | 7/2005 | DeWitt, Jr. et al. | |

OTHER PUBLICATIONS

International Search Report and Written Opinion issued on Apr. 26, 2012, for counterpart International Application No. PCT/US2011/67629.

* cited by examiner

*Primary Examiner* — Van Nguyen
(74) *Attorney, Agent, or Firm* — Patent Capital Group

(57) ABSTRACT

A system and method for a performance monitoring hardware unit that may include logic to poll one or more performance monitoring shared resources and determine a status of each performance monitoring shared resource. The performance monitoring hardware unit may also include an interface to provide the status to allow programming of the one or more performance monitoring shared resource. The status may correspond to a usage and/or an errata condition. Thus, the performance monitoring hardware unit may prevent programming conflicts of the one or more performance monitoring shared resources.

21 Claims, 4 Drawing Sheets

300

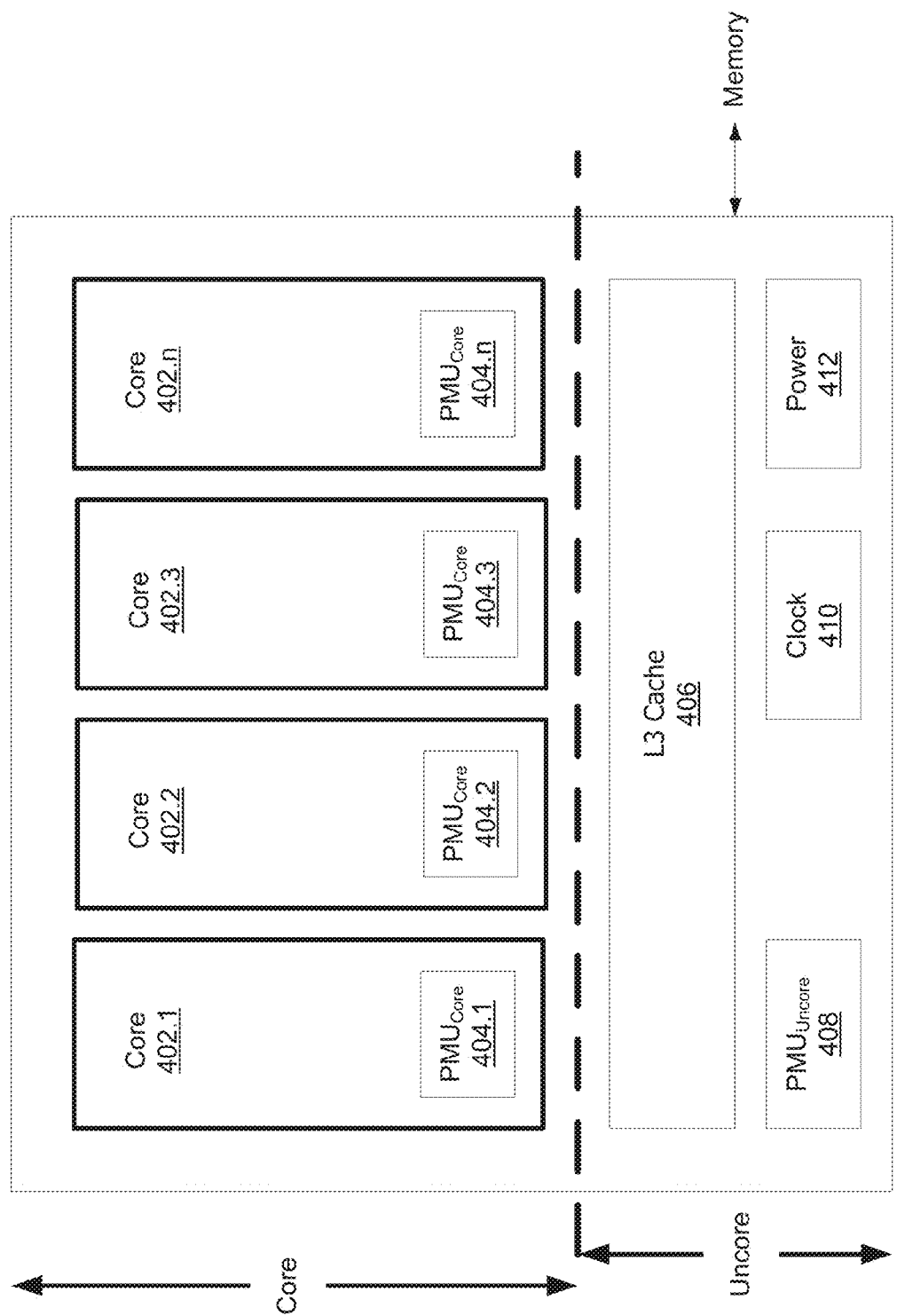

PERFORMANCE MONITORING OF SHARED PROCESSING RESOURCES

FIELD OF THE INVENTION

The present disclosure relates to performance monitoring hardware, in particular, to providing a programmed status information interface.

BACKGROUND OF THE INVENTION

Many applications can be executed by a single processor at the same time. The processor, however, has a finite amount of resources that different applications must share. These resources include counters, interrupts, etc. The shared resources are typically allocated on some dynamic type basis where a later application can wipe out programming of an already in use shared resource by an earlier application. Thus, the applications are in competition for the shared resources.

In conventional systems, an application looking to use shared resources has to poll each shared resource independently to determine the particular resource's availability. This cumbersome technique can lead to performance penalties such as latency and redundancy. For example, two different applications may poll a resource at about the same time with both independently determining an available condition. Consequently, both applications may try to program the same shared resource leading to an overwrite error for at least one of the applications.

Moreover, the applications, in conventional systems, also have to cross check a separate published errata report to verify that the particular requested resource is operational as well as available. This cross checking can lead to extra processing time and, consequently, slow computing.

DESCRIPTION OF THE FIGURES

FIG. 4 is a simplified block diagram of a processor according to an embodiment of the present invention.

DETAILED DESCRIPTION

Embodiments of the present invention may provide a performance monitoring hardware unit that may include logic to poll one or more performance monitoring shared resources and determine a status of each performance monitoring shared resource. The performance monitoring hardware unit may also include an interface to provide the status to allow programming of the one or more performance monitoring shared resource. Thus, the performance monitoring hardware unit may prevent programming conflicts of the one or more performance monitoring shared resources.

Embodiments of the present invention may provide a method for performance monitoring that may include checking status of one or more performance monitoring shared resources and providing the status to allow programming of the one or more performance monitoring shared resources.

Embodiments of the present invention may provide a processor with at least one performance monitoring shared resource. The processor may also include a performance monitoring unit to check an operational status of the at least one performance monitoring shared resource, the performance monitoring unit including an interface to provide the operational status to allow for programming of the at least one performance monitoring shared resource.

Figure 1:
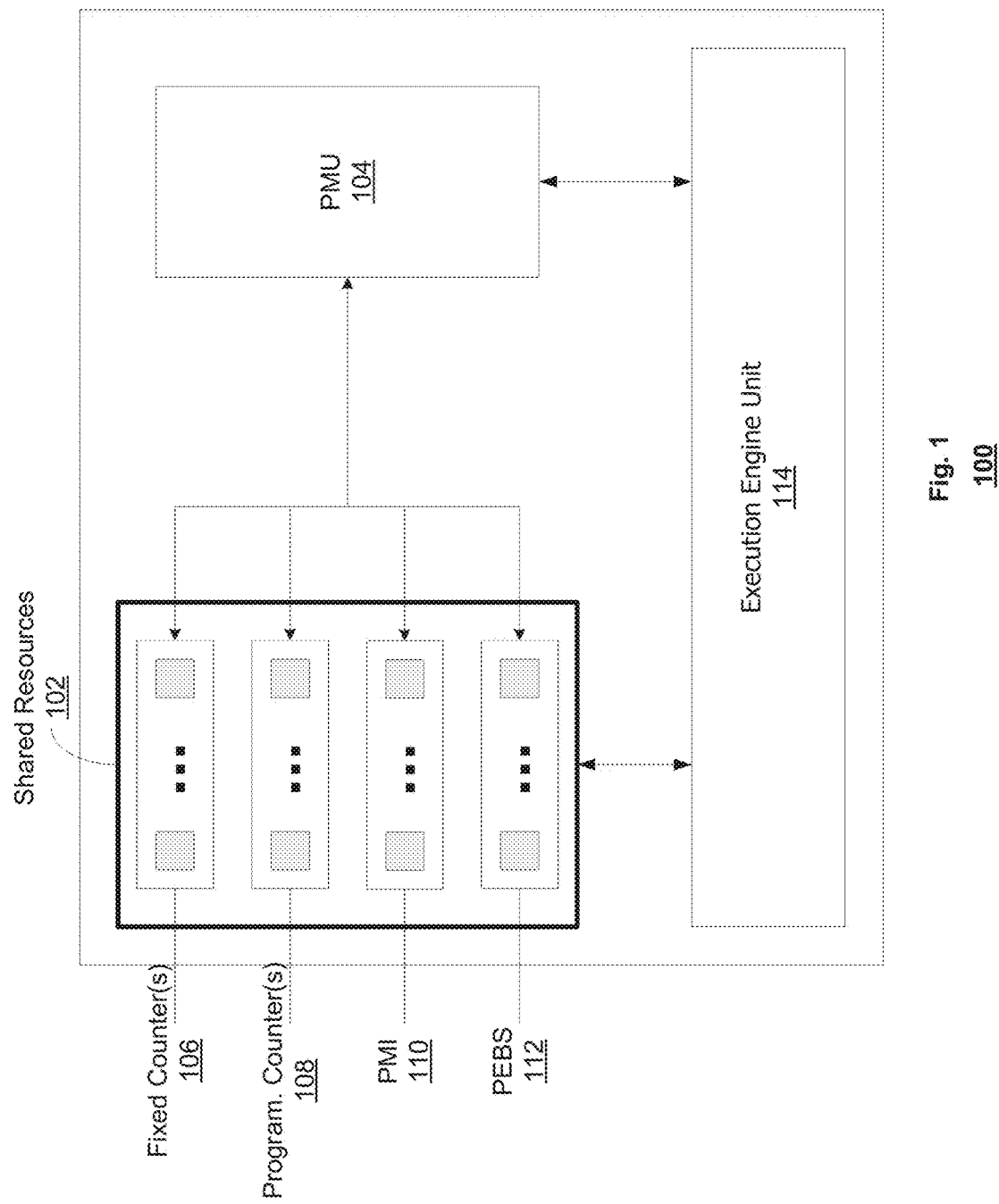
FIG. 1 illustrates a simplified block diagram of a processor according to an embodiment of the present invention.

FIG. 1 is a simplified block diagram of an exemplary processor 100 in accordance with one embodiment of the present invention. The processor 100 may include shared resources 102, a performance monitoring unit (PMU) 104, and an execution engine unit 114. The processor 100 may include various other known components (not shown) to perform algorithms to process data, in accordance with the present invention.

For example, the processor 100 may include a memory (not shown) such as a Level 1 (L1) internal cache. Depending on the architecture, the processor 100 may have a single internal cache or multiple levels of internal cache. Alternatively, in another embodiment, the cache memory may reside external to the processor 100. Other embodiments may also include a combination of both internal and external caches depending on the particular implementation and needs.

The shared resources 102 may include but are not limited to fixed counter(s) 106, programmable counter(s) 108, performance monitoring interrupt(s) (PMI) 110, and precise event based sampling (PEBS) component(s) 112. The fixed counter(s) 106 may include one or more fixed counters associated with the processor 100. For example, in an embodiment, the fixed counter(s) 106 may be provided as three separate fixed counters. In an embodiment, the fixed counter(s) 106 may be used for tracking the most commonly used events such as instructions retired, core cycles, reference cycles or the like. The programmable counter(s) may include one or more programmable counters associated with the processor 100. For example, the programmable counter(s) 108 may be provided as four separate counters in a multi-thread processor embodiment or eight separate counters in a single-thread processor embodiment. The PMI 110 may be provided as one or more interrupts. In an embodiment, the PMI 110 may be used to stop a process based on an event such as a counter overflowing. Also, the PEBS 112 may be provided as one or more PEBS components. PEBS may be a model specific sampling extension and may utilize debug store (DS) save area, which may correspond to a software-designated area of memory used to collect records such as branch records, PEBS records, etc. PEBS components may include programmable counters with restrictions such as a limited event. For example, PEBS events may be qualified to be counted when the associated instruction retires. The shared resources may also include other sampling components or instruction tracing components. For example, LBRs (Last Branch Record), an instruction tracing type component, may be provided as a shared resource. LBRs may be circular queues for taken branches (i.e., To and From IPs).

The shared resources 102 may be used to detect various events. For example, the shared resources 102 may be used to detect events such as cache misses, number of instructions retired, cycle counts, number of branches retired, etc. Further, the type of events detected by the shared resources 102 may be programmable by an executing application.

The PMU 104 may be a hardware unit that monitors each shared resource 102 for its respective operational status and provides an interface for the indicated status. The PMU 104 may monitor the shared resources' 102 programming status and/or errata condition. The PMU 104 may include an interface to convey the indicated statuses. The interface may be provided as a model specific register (MSR). The PMU 104 may include logic to perform algorithms, in accordance with the present invention, such as in the embodiment described herein. In an embodiment, The PMU 104 may be provided as a ring 0 programmable measurement hardware. Thus, the PMU 104 may have the highest level of privileges and access control associated with it in the processor 100.

The execution engine unit 114 may include logic to execute one or more applications. The application(s) may be programmed by an end user. In an embodiment, the execution engine unit 114 may perform integer and floating point operations. For one embodiment, the execution engine unit 114 may include logic to handle a packaged instruction set. By including the packaged instruction set in the instruction set of the processor 100, along with associated circuitry to execute the instructions, the operations used by many multimedia applications may be performed using packaged data in the processor 100. Thus, many multimedia applications may be accelerated and executed more efficiently by using the full width of a processor's data bus for performing operations on packaged data. This can eliminate the need to transfer smaller units of data across the processor's data bus to perform one or more operations one data element at a time.

Figure 2:
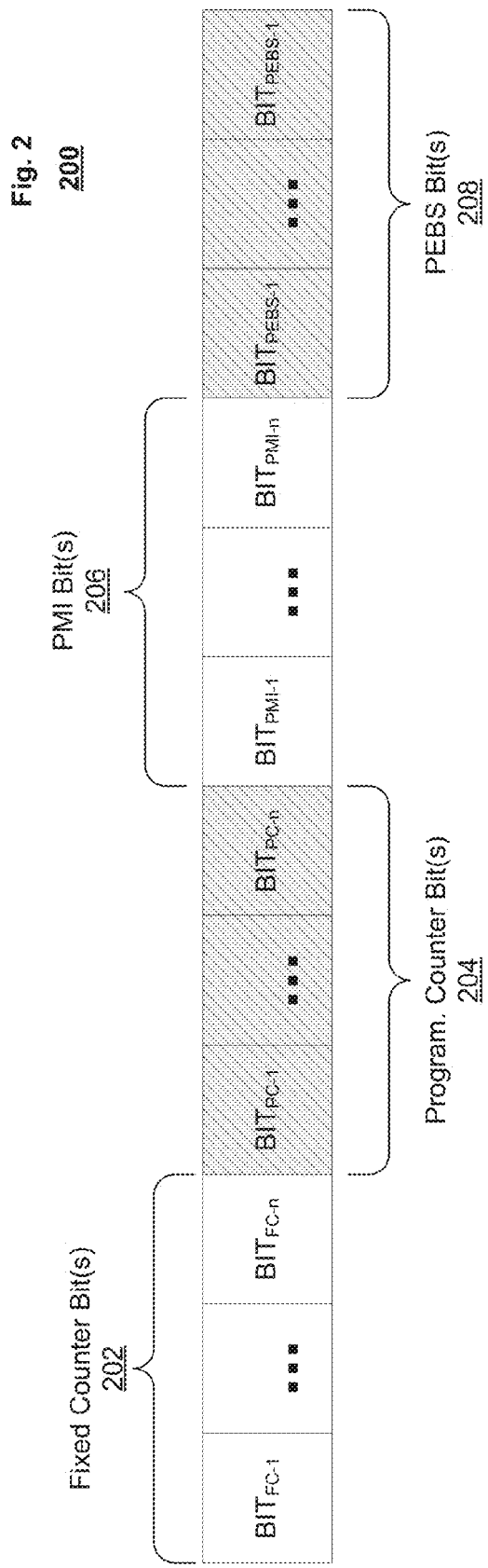
FIG. 2 illustrates a simplified interface representation according to an embodiment of the present invention.

FIG. 2 illustrates an exemplary PMU interface in accordance with one embodiment of the present invention. The PMU interface 200 may provide a comprehensive, standardized interface for conveying availability information relating to shared resources of the processor system. In an embodiment, the PMU interface 200 may be a register(s) file, which may include individual bit positions corresponding to each monitored shared resource. For example, the PMU interface 200 may include fixed counter bit(s) 202, programmable counter bit(s) 204, PMI bit(s) 206, and PEBS bit(s) 208. Each fixed counter bit(s) 202 may be associated with a corresponding fixed counter 106 of FIG. 1. Each programmable bit(s) 204 may be associated with a corresponding programmable counter 108 of FIG. 1. Each PMI bit(s) 206 may be associated with a corresponding PMI 110 of FIG. 1. Each PEBS bit(s) 208 may be associated with a corresponding PEBs 112 of FIG. 1. Furthermore, the PMU interface 200 may include additional bit positions corresponding to other monitored shared resources.

In an embodiment, PMI bit(s) 206 and PEBS bit(s) 208 may be provided together as combined bit(s) in the PMU interface 200.

In an embodiment, each bit in the PMU interface 200 may contain a zero or non-zero (e.g., "1") value. A zero value may indicate that the particular shared resource is available for use. Thus, a zero value may indicate that the particular shared resource is not being currently used and/or is free of an errata condition. A non-zero value may indicate that the particular shared resource is unavailable for use. Thus, a non-zero value may indicate that the particular shared resource is being currently used and/or has an errata condition.

Figure 3:
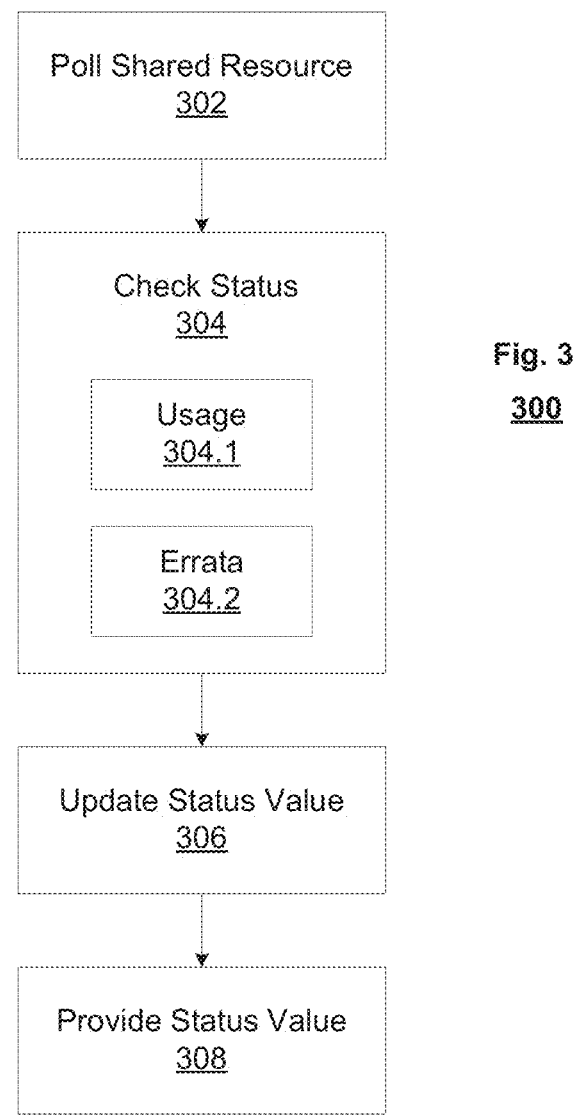
FIG. 3 illustrates a simplified process of performance monitoring according to an embodiment of the present invention.

FIG. 3 illustrates a simplified process flow of PMU operations in accordance with one embodiment of the present invention. In step 302, the PMU may poll the shared resource(s). In one embodiment, polling may be performed periodically based on a predetermined clock cycle. Alternatively, polling may be triggered by a predetermined condition. In yet another embodiment, polling may be performed periodically as well as being triggered by a predetermined condition.

In step 304, the PMU may check the status of the polled shared resource(s). In particular, the PMU may check the usage condition (step 304.1) and/or the errata condition (step 304.2) of the polled shared resource(s). The usage condition may be determined by checking a specified field of the particular shared resource.

In an embodiment, a programmable counter usage condition may be determined by checking an "event select field". For example, an in-use condition may be indicated by a non-zero value in the "event select field" and, conversely, a non-use condition may be indicated by a zero value in the "event select field". The usage condition may be checked using a logical 'OR' operation of encoding bits of the shared resource's event select field to check if the shared resources have been programmed. In an embodiment, a fixed counter usage condition may be determined by checking an "enable field". For example, an in-use condition may be indicated by a non-zero value in the "enable field" and, conversely, a non-use condition may be indicated by a zero value in the "enable field".

In an embodiment, a PMI usage condition may be determined by checking a PMI associated bit or bits in a corresponding fixed counter field. For example, an in-use condition may be indicated by non-zero value(s) in the PMI associated bit(s) in the corresponding fixed counter field and, conversely, a non-use condition may be indicated by a zero value in the PMI associated bit(s) in the corresponding fixed counter field.

PEBS may be enabled on a counter (e.g., programmable counter). In an embodiment, PEBS usage condition may be determined by checking a PEBS associated bit or bits in a corresponding counter field. In an embodiment, the PMI enabling associated bit(s) may be integrated into the PMI associated bit(s) in the relevant counters.

The errata condition may be may be determined by checking published errata report for the particular shared resource. In an embodiment, the errata condition may be set internally in the processor, and the status bit for the errata condition shared resource may be written by a microcode (i.e., a ucode).

In step 306, after checking shared resource status, the PMU may update the associated shared resource status indication value accordingly in the PMU interface. In an embodiment, the updated status may indicate the presence of a usage condition, an errata condition or the presence of either a usage condition or errata condition. The update for the usage condition may be performed by a WRMSR (write to MSR) command, and the update for the errata condition may be performed internally.

In step 308, the PMU may provide status value. For example, the PMU may provide the status value to a requesting application. The status value may be provided via a RMSR (read from MSR) command. In an embodiment, with respect to an execution engine unit the PMU interface may be a read-only interface.

In an embodiment, usage condition and errata condition may be initially maintained separately in respective bits. The PMU may combine the usage condition and errata condition into one overall status value when the PMU provides the status value, for example to a requesting application. This may allow the PMU interface (e.g., MSR) to power down periodically as part of a power management scheme without losing condition states.

Therefore, PMU embodiments as described herein may provide comprehensive status information that will allow OS (operating system) arbiters a viable means to provide effective resource management. Proper arbitration of shared resource components between applications (i.e., multiple end users) facilitates efficient and reliable shared resource components programming, for example by preventing different applications from overwriting components already in use.

In an embodiment of the present invention, a PMU may be provided separately for core components and uncore components. The PMU may be provided in a single core or a many core processor. FIG. 4 is a simplified block diagram of an exemplary processor 400 in accordance with one embodiment of the present invention. The processor 400 may be provided as a many core processor and may include core components and uncore components.

The core components may include a plurality of cores 402.1-402.n and corresponding $PMU_{Core}$ 404.1-404.n. The cores 402.1-402.n may be provided as any type of architecture, including but not limited to a complex instruction set computing (CISC), a reduced instruction set computing (RISC), a very long instruction word (VLIW) type or hybrid architecture. As yet another option, the cores 402.1-402.n may be provided as special-purpose cores, such as, for example, a network or communication core, compression engine, graphics core, or the like. The cores 402.1-402.n may also be suitable for manufacture in ore or more process technologies and by being represented on a machine readable media in sufficient detail, may be suitable to facilitate said manufacture.

The $PMU_{Core}$ 404.1-404.n may be provided as hardware units that monitor associated shared resources for their respective status. The $PMU_{Core}$ 404.1-404.n may provide an interface for the indicated status. The $PMU_{Core}$ 404.1-404.n structure and operations may be provided as described above in various embodiments discussed herein. The $PMU_{Core}$ 404.1-404.n may monitor various shared resources (e.g., fixed counters, program counters, PMI, PEBS.) that measure various hardware thread data such as branch statistics, load profiles, cache hit/miss rates, NUMA (Non-Uniform Memory Access), etc.

The uncore components may include a L3 cache 406, a $PMU_{Uncore}$ 408, a clock 410, a power component 412, and various other known uncore components that are not described here so as to not obscure the objects of the present invention. The uncore components may also be coupled to a memory, such as a DRAM.

The $PMU_{Uncore}$ 408 may be provided as a hardware unit that monitors associated shared resources for their respective status. The $PMU_{Uncore}$ 408 may provide an interface for the indicated status. The $PMU_{Uncore}$ 408 structure and operations may be provided as described above in various embodiments discussed herein. The $PMU_{Core}$ 404.1-404.n may monitor various shared resources (e.g., fixed counters, program counters, PMI, PEBS) that measure various hardware socket data such as memory bandwidth, last level cache, IO bandwidth, interconnect utilization, etc.

In an embodiment, the $PMU_{Core}$ 404.1-404.n and $PMU_{Uncore}$ 408 may be provided as a single integrated PMU.

Embodiments of the present invention may be implemented in a computer system. Embodiments of the present invention may also be implemented in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), a system on a chip, network computers (NetPC), set-top boxes, network hubs, wide area network (WAN) switches, or any other suitable system.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor, comprising:
   logic to poll shared processing resources and determine a status of each of the shared processing resources, wherein the status corresponds to a usage condition and an errata condition for each of the shared processing resources, wherein the usage condition indicates availability and the errata condition indicates operability, wherein usage conditions are determined from a particular field of each of the respective shared processing resources and the errata condition is determined from an errata report corresponding to the shared processing resources, and wherein each of the shared processing resources is polled independent of whether an application requests use of at least one of the shared processing resources;
   a register to store an indicator of the status of each of the shared processing resources; and
   an interface to provide the status of the shared processing resources to allow programming of the shared programming resources.

2. The processor of claim 1, wherein the shared processing resources include a counter.

3. The processor of claim 1, wherein the shared processing resources include an interrupt.

4. The processor of claim 1, wherein the shared processing resources include a sampling component.

5. The processor of claim 1, wherein the shared processing resources include an instruction tracing component.

6. The processor of claim 1, wherein the shared processing resources measure hardware thread data or hardware socket data.

7. The processor of claim 1, wherein the register includes four possible values for each of the shared processing resources, a first value corresponding to an available condition for each of the shared processing resources, a second value corresponding to an unavailable condition for each the shared processing resources, a third value corresponding to an operable condition for each of the shared processing resources, and a fourth value corresponding to a not operable condition for each of the shared processing resources.

8. A non-transitory computer-readable medium storing program instructions that, when executed, cause a processor to perform a method of monitoring performance comprising:

checking status of shared processing resources, wherein the status corresponds to a usage condition and an errata condition for each of the shared processing resources, wherein the usage condition indicates availability and the errata condition indicates operability, wherein usage conditions are determined from a particular field of each of the respective shared processing resources and the errata condition is determined from an errata report corresponding to the shared processing resources, and wherein the status of each of the shared processing resources is checked independent of whether an application requests use of at least one of the shared processing resources;

storing in a register indicators of the usage condition and the errata condition for each of the shared processing resources; and providing the status to allow programming of each of the shared processing resources.

9. The method of claim 8, wherein the shared processing resources include a counter.

10. The method of claim 8, wherein the shared processing resources include an interrupt.

11. The method of claim 8, wherein the shared processing resources include a sampling component.

12. The method of claim 8, wherein the shared processing resources include an instruction tracing component.

13. The method of claim 8, wherein the shared processing resources measure hardware thread data or hardware socket data.

14. The method of claim 8, wherein the register includes four possible values, a first value corresponding to an available condition of a particular shared processing resource, a second value corresponding to an unavailable condition of the particular shared processing resource, a third value corresponding to an operable condition of the particular shared processing resource, and a fourth value corresponding to a not operable condition of the particular shared processing resource.

15. A processor, comprising:
shared processing resources;
a performance monitoring unit to check availability and operational status of the shared processing resources, wherein the availability and operational status corresponds to a usage condition and an errata condition for the shared processing resources, wherein usage conditions are determined from a particular field of each of the respective shared processing resources and the errata condition is determined from an errata report corresponding to the shared processing resources, and wherein the availability and operational status of each of the shared processing resources are checked independent of whether an application requests use of at least one of the shared processing resources; and a register to store indicators of the usage condition and the errata condition for the shared processing resources;

wherein the performance monitoring unit includes an interface to provide the availability and operational status to allow programming of the shared processing resources.

16. The processor of claim 15, wherein the shared processing resources include a counter.

17. The processor of claim 15, wherein the shared processing resources include an interrupt.

18. The processor of claim 15, wherein the shared processing resources include a sampling component.

19. The processor of claim 15, wherein the shared processing resources include an instruction tracing component.

20. The processor of claim 15, wherein a particular shared processing resource measures hardware thread data or hardware socket data.

21. The processor of claim 15, wherein the register includes four possible values for each of the shared processing resources, a first value corresponding to an available condition for each of the shared processing resources, a second value corresponding to an unavailable condition for each of the shared processing resources, a third value corresponding to an operable condition for each of the shared processing resources, and a fourth value corresponding to a not-operable condition for each of the shared processing resources.

* * * * *